United States Patent
Buskilla et al.

(10) Patent No.: US 12,105,647 B2
(45) Date of Patent: Oct. 1, 2024

(54) ASYNCHRONOUS RESERVATION OF STORAGE VOLUMES WITH PERSISTENT STORAGE OF RESERVATION DATA

(71) Applicant: EMC IP Holding Company LLC, Hopkinton, MA (US)

(72) Inventors: Mor Buskilla, Beer Yaakov (IL); Chen Reichbach, Tel Aviv (IL); Amit Engel, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/460,568

(22) Filed: Aug. 30, 2021

(65) Prior Publication Data
US 2023/0066513 A1 Mar. 2, 2023

(51) Int. Cl.
*G06F 13/16* (2006.01)
*G06F 13/42* (2006.01)

(52) U.S. Cl.
CPC ...... *G06F 13/1668* (2013.01); *G06F 13/4234* (2013.01); *G06F 2213/0036* (2013.01)

(58) Field of Classification Search
None
See application file for complete search history.

(56) References Cited

U.S. PATENT DOCUMENTS

| | | | | |
|---|---|---|---|---|
| 5,140,689 | A * | 8/1992 | Kobayashi | G06F 11/1474 714/E11.13 |
| 9,697,086 | B2 * | 7/2017 | Dutch | G06F 11/1448 |
| 10,055,298 | B2 * | 8/2018 | Dutch | G06F 11/1448 |
| 10,901,932 | B2 * | 1/2021 | Purcell | G06F 13/4022 |
| 10,922,184 | B2 * | 2/2021 | Dutch | G06F 11/1448 |
| 2011/0004586 | A1 * | 1/2011 | Cherryholmes | G06F 11/1471 707/682 |

(Continued)

OTHER PUBLICATIONS

Mehis et al., Designing and Optimizing Dell/EMC SAN Configurations, Part 2, Dell Power Solutions, Oct. 2004.

(Continued)

*Primary Examiner* — Henry Tsai
*Assistant Examiner* — Christopher A Bartels
(74) *Attorney, Agent, or Firm* — Ryan, Mason & Lewis, LLP

(57) ABSTRACT

Techniques are provided for asynchronous reservation of storage volumes in a storage system with persistent storage of reservation data. One method comprises obtaining, by a target storage device, a reservation command from a host device that requests to reserve a storage volume of the target storage device; creating a new execution thread to process the reservation command, wherein an execution of the reservation command is asynchronous; storing an intermediate result of the reservation command in a persistent storage, wherein the stored intermediate result allows the execution of the reservation command to restart from an execution point following the storage of the intermediate result; and initiating a notification to the host device of the reservation of the storage volume in response to a completion of the execution of the reservation command. The target storage device may recover from a failure during a processing of the reservation command by loading a stored intermediate result from the persistent storage.

20 Claims, 8 Drawing Sheets

(56) References Cited

U.S. PATENT DOCUMENTS

| | | | | |
|---|---|---|---|---|
| 2012/0266129 | A1* | 10/2012 | Massoudi | G06F 8/31 |
| | | | | 717/105 |
| 2014/0201761 | A1* | 7/2014 | Dalal | H04L 67/1097 |
| | | | | 718/108 |
| 2018/0204111 | A1* | 7/2018 | Zadeh | G06V 10/764 |
| 2020/0042350 | A1* | 2/2020 | Deval | G06F 9/45558 |
| 2020/0065297 | A1* | 2/2020 | Taylor | G06F 16/27 |
| 2020/0184278 | A1* | 6/2020 | Zadeh | G06N 3/044 |
| 2020/0313886 | A1* | 10/2020 | Poeppelmann | H04L 9/3236 |
| 2020/0358187 | A1* | 11/2020 | Tran | G06N 3/045 |
| 2020/0409807 | A1* | 12/2020 | Kale | G06F 3/0659 |
| 2021/0119930 | A1* | 4/2021 | Debbage | H04L 1/1642 |
| 2021/0141910 | A1* | 5/2021 | Numata | G06F 21/40 |
| 2021/0311900 | A1* | 10/2021 | Malladi | G06F 13/1663 |
| 2022/0027051 | A1* | 1/2022 | Kant | G06F 3/0605 |
| 2022/0121884 | A1* | 4/2022 | Zadeh | G06V 10/764 |
| 2022/0210225 | A1* | 6/2022 | Shilimkar | H04L 12/4641 |

OTHER PUBLICATIONS

Dell EMC Power Store: Introduction to the Platform H18149, Jan. 2021.
Dell EMC Power Store: Introduction to the Platform H18149.5, Jun. 2021.
Dell EMC Power Store: Data Efficiencies H18151.2, Apr. 2021.
NVM Express—Over Fabrics, Revision 1.1a, Jul. 12, 2021.
NVM Express—Base Specification, Revision 2.0a, Jul. 23, 2021.
NVM Express—NVMe Over Fabrics—Part Two, Dec. 7, 2018.

* cited by examiner

ASYNCHRONOUS RESERVATION OF STORAGE VOLUMES WITH PERSISTENT STORAGE OF RESERVATION DATA

FIELD

The field relates generally to information processing systems, and more particularly to storage in such systems.

BACKGROUND

Input/output operations (e.g., read and write operations) associated with a storage volume within a storage system are typically generated by a host device. Storage volume reservations allow two or more host devices to coordinate access to a shared storage volume. A reservation of a given storage volume by a particular host device restricts access to the given storage volume to the particular host device.

A need exists for improved techniques for reserving a storage volume.

SUMMARY

In one embodiment, a method comprises obtaining, by a target storage device, a reservation command from a host device, wherein the reservation command comprises a request to reserve a storage volume of the target storage device; creating a new execution thread to process the reservation command, wherein an execution of the reservation command is asynchronous; storing at least one intermediate result of the reservation command in a persistent storage, wherein the stored at least one intermediate result allows the execution of the reservation command to restart from an execution point following the storage of the at least one intermediate result; and initiating a notification to the host device of the reservation of the storage volume in response to a completion of the execution of the reservation command.

In some embodiments, the reservation command is provided by a front-end entity of the target storage device to a system manager of the target storage device for execution and wherein the asynchronous execution comprises the front-end entity of the target storage device processing one or more additional operations while the reservation command is executed by the system manager.

In one or more embodiments, in response to a failure during a processing of the reservation command, the target storage device recovers by loading at least one of the stored at least one intermediate result from the persistent storage.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for asynchronous reservation of storage volumes with persistent storage of reservation data in a storage system, for example, using integer programming techniques.

In one or more embodiments, the disclosed techniques for asynchronous reservation of storage volumes support a high scale of mapped storage volumes. Among other benefits, the disclosed asynchronous implementation of the reservation command allows other commands to be executed in parallel with a processing of the reservation command, as discussed further below. Thus, a greater number of reservation commands can be executed in parallel using a similar amount of resources.

In addition, the disclosed persistent storage of reservation data while a given reservation command is being processed provides fault tolerance and allows a roll-forward recovery if a failure occurs during the processing of the given reservation command. In this manner, the availability of the storage system is improved.

While one or more exemplary embodiments are discussed herein in the context of a storage system that employs an Non-Volatile Memory Express (NVMe) standard, the disclosed techniques for asynchronous reservation of storage volumes with persistent storage of reservation data can be applied to any storage system that uses a reservation protocol for shared access to a storage volume, such as a storage system that employs a Small Computer System Interface (SCSI) standard, as would be apparent to a person of ordinary skill in the art.

Figure 1:
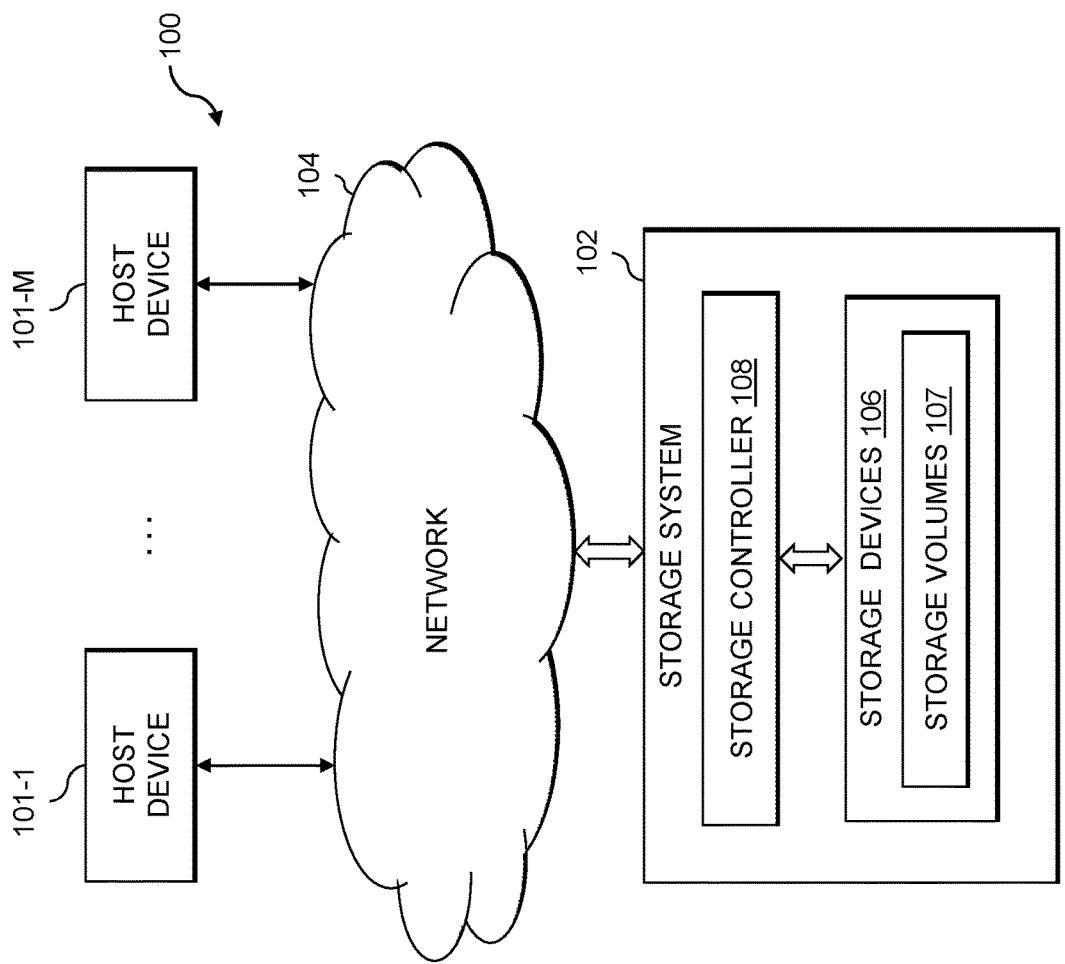
FIG. 1 illustrates an information processing system configured for asynchronous reservation of storage volumes with persistent storage of reservation data in accordance with an illustrative embodiment.

FIG. 1 shows an information processing system 100 configured in accordance with an illustrative embodiment. The information processing system 100 comprises a plurality of host devices 101-1 through 101-M, collectively referred to herein as host devices 101. The host devices 101 are configured to communicate with a storage system 102 over a network 104.

The host devices 101 illustratively comprise servers or other types of computers of an enterprise computer system, cloud-based computer system or other arrangement of multiple compute nodes associated with respective users.

For example, the host devices 101 in some embodiments illustratively provide compute services such as execution of one or more applications on behalf of each of one or more users associated with respective ones of the host devices. Such applications illustratively generate input-output (IO) operations that are processed by the storage system 102. The term "input-output" as used herein refers to at least one of input and output. For example, IO operations may comprise write requests and/or read requests directed to logical addresses of a particular logical storage volume of the storage system 102. These and other types of IO operations are also generally referred to herein as IO requests.

The storage system 102 illustratively comprises processing devices of one or more processing platforms. For example, the storage system 102 can comprise one or more processing devices each having a processor and a memory, possibly implementing virtual machines and/or containers, although numerous other configurations are possible.

The storage system 102 can additionally or alternatively be part of a cloud infrastructure such as an Amazon Web Services (AWS) system. Other examples of cloud-based systems that can be used to provide at least portions of the storage system 102 include Google Cloud Platform (GCP) and Microsoft Azure.

The host devices 101 and the storage system 102 may be implemented on a common processing platform, or on separate processing platforms. The host devices 101 are illustratively configured to write data to and read data from the storage system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 102 comprises a plurality of storage devices 106 and an associated storage controller 108. The storage devices 106 store data of a plurality of storage volumes 107. For example, the storage volumes 107 may illustratively comprise respective logical units (LUNs) or other types of logical storage volumes. It is noted that in the context of a Linux/Unix system, a volume relates to a Logical Volume Manager (LVM), which can be used to manage mass storage devices; a physical volume generally refers to a storage device or partition; and a logical volume is created by the LVM and is a logical storage device (e.g., a LUN) which can span multiple physical volumes. The term "storage volume" as used herein is intended to be broadly construed, and shall encompass, for example, a virtual disk, other units of data storage, a logical storage volume, and a namespace, and should not be viewed as being limited to any particular format or configuration.

The storage devices 106 of the storage system 102 illustratively comprise solid state drives (SSDs). Such SSDs are implemented using NVM devices such as flash memory. Other types of NVM devices that can be used to implement at least a portion of the storage devices include non-volatile random access memory (NVRAM), phase-change RAM (PC-RAM), magnetic RAM (MRAM), resistive RAM, and spin torque transfer magneto-resistive RAM (STT-MRAM). These and various combinations of multiple different types of NVM devices may also be used. For example, hard disk drives (HDDs) can be used in combination with or in place of SSDs or other types of NVM devices in the storage system 102.

It is therefore to be appreciated that numerous different types of storage devices 106 can be used in the storage system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives, storage appliances or other types of storage devices.

In some embodiments, the storage system 102 illustratively comprises a scale-out all-flash distributed content addressable storage (CAS) system, such as a storage array. A wide variety of other types of distributed or non-distributed storage arrays can be used in implementing the storage system 102 in other embodiments. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as NAS, storage area networks (SANs), direct-attached storage (DAS) and distributed DAS, as well as combinations of these and other storage types, including software-defined storage.

In some embodiments, communications between the host devices 101 and the storage system 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage system 102 illustratively comprise SCSI or iSCSI commands, other embodiments can implement IO operations utilizing command features and functionality associated with NVMe, as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The host devices 101 are configured to interact over the network 104 with the storage system 102. Such interaction illustratively includes generating IO operations, such as write and read requests, and sending such requests over the network 104 for processing by the storage system 102. In some embodiments, each of the host devices 101 comprises a multi-path input-output (MPIO) driver configured to control delivery of IO operations from the host device to the storage system 102 over selected ones of a plurality of paths through the network 104. The MPIO driver may comprise, for example, an otherwise conventional MPIO driver. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 102.

In some embodiments, the storage system 102 is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 102 in such an embodiment collectively comprise at least a portion of the storage controller of the storage system 102. For example, in some embodiments the sets of processing modules of the storage nodes collectively comprise a distributed storage controller of the storage system 102. A "distributed storage system" as that term is broadly used herein is intended to encompass any storage system that is distributed across multiple storage nodes.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

The storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 may be implemented in whole or in part on the same processing platform as the storage system 102, or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 101 and the storage system 102 to reside in different data centers.

Additional examples of processing platforms utilized to implement host devices 101 and storage system 102 in illustrative embodiments will be described in more detail below in conjunction with FIGS. 7 and 8.

It is to be appreciated that these and other features of illustrative embodiments are presented by way of example only, and should not be construed as limiting in any way.

Accordingly, different numbers, types and arrangements of system components such as host devices 101, storage system 102, and network 104 can be used in other embodiments.

It should be understood that the particular sets of components implemented in the system 100 as illustrated in FIG. 1 are presented by way of example only. In other embodiments, only subsets of these components, or additional or alternative sets of components, may be used, and such components may exhibit alternative functionality and configurations.

Figure 2:
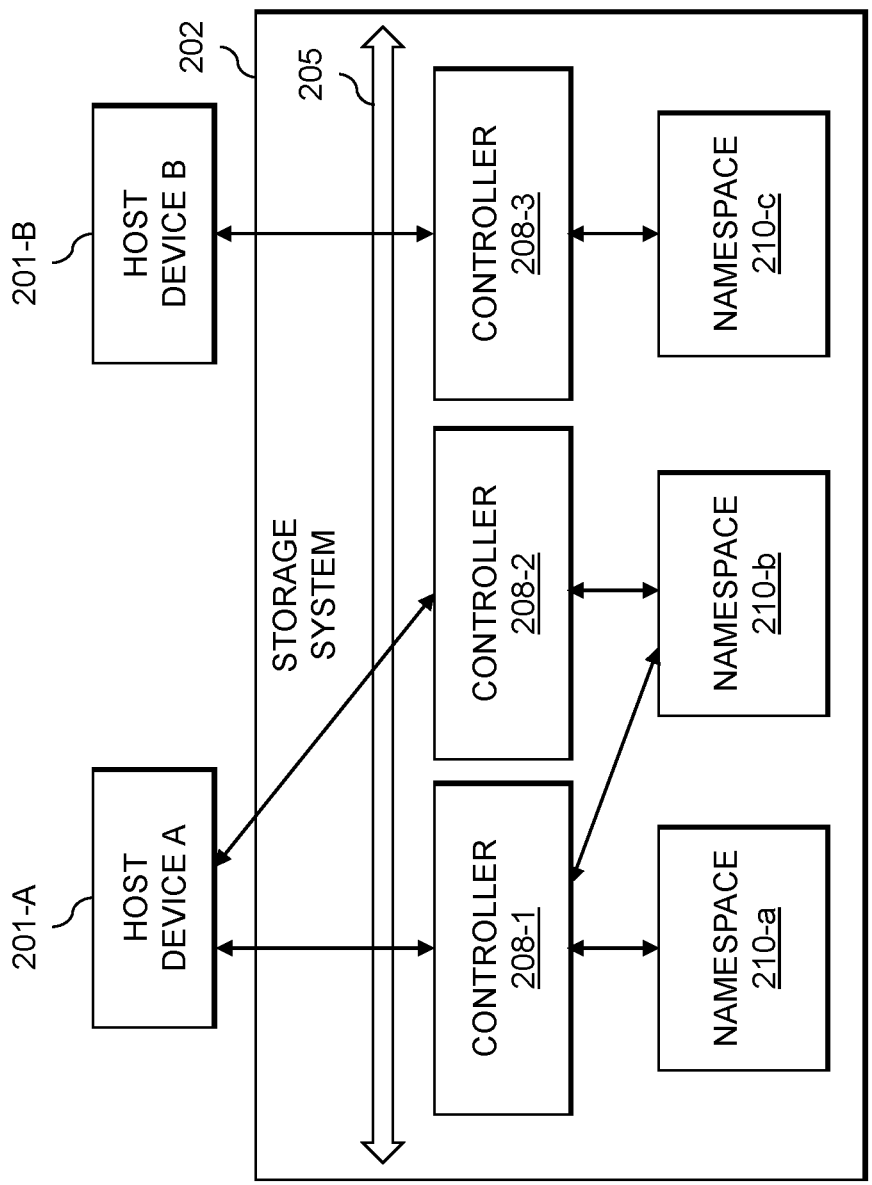
FIG. 2 illustrates multiple host devices accessing one or more namespaces of a storage system, according to one or more embodiments.

FIG. 2 illustrates multiple host devices 201-A and 201-B (collectively referred to herein as host devices 201) accessing namespaces 210-a, 210-b and 210-c (collectively referred to herein as namespaces 210) of a storage system 202, according to one or more embodiments. One or more of the namespaces 210 may comprise a shared namespace requiring a reservation by a host device 201 to restrict access to the shared namespace.

As shown in FIG. 2, the storage system 202 further comprises multiple controllers 208-1, 208-2 and 208-3 (collectively referred to herein as controllers 208). The controllers 208 of the storage system 202 may communicate with host devices 201 using ports 205.

In some embodiments, when a host device 201 attempts to access a target storage device, a controller 208 is created on the target storage device. In the example of FIG. 2, host device 201-A is associated with controllers 208-1 and 208-2, while host device 201-B is associated with controller 208-3. A host device 201 may thus be associated with multiple controllers 208 (e.g., by registering the same host identifier with each controller 208 that the host device 201 it is associated with). Thus, a host identifier for a particular host, such as host device 201-A, allows controllers 208 to be identified that are associated with the same host device 201-A. In this manner, reservation properties can be preserved across these controllers 208.

As noted above, a reservation of a given namespace 210 by a particular host device 201 restricts access to the given namespace 210 to only the particular host device 201. In this manner, a reservation command creates an association between a host and a namespace. If a host device 201 submits a command to a namespace 210, for example, in the presence of a reservation and lacks sufficient rights, then the command is aborted by the controller 208 with a status of "reservation conflict."

Figure 3:
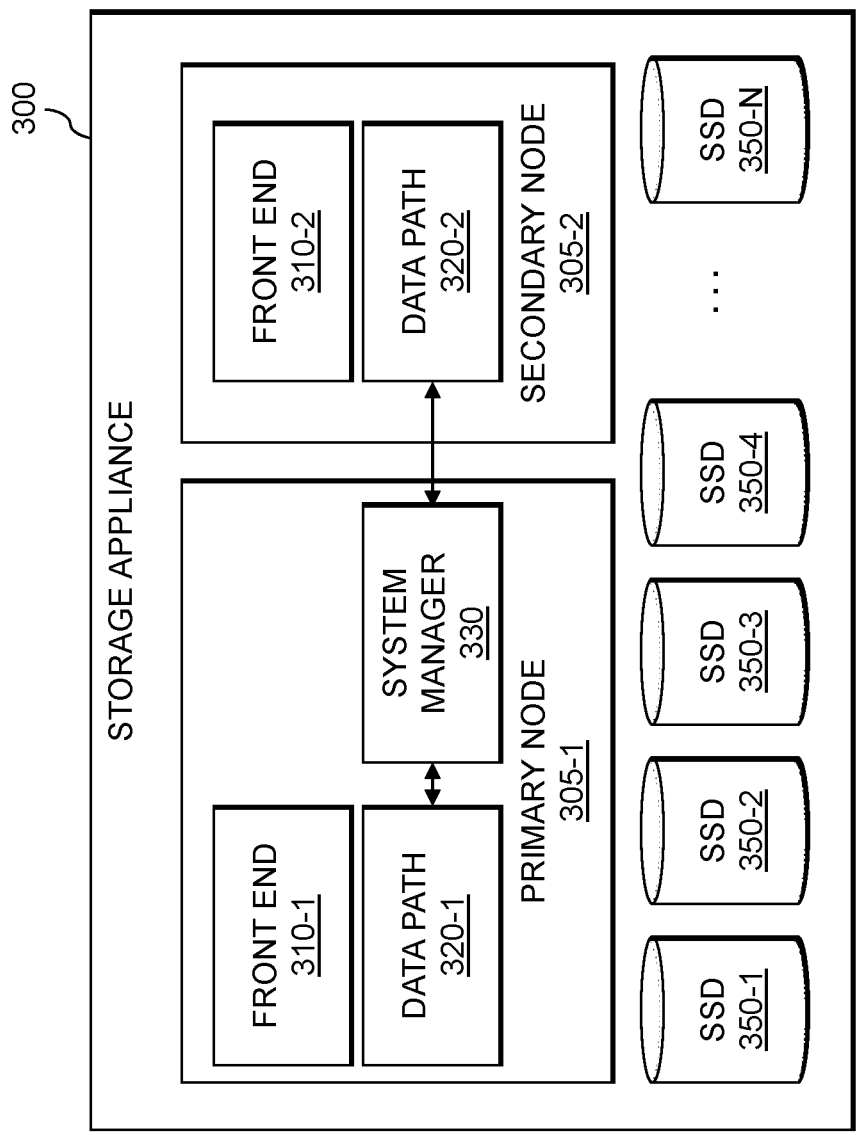
FIG. 3 illustrates an exemplary dual-node storage appliance that may comprise at least a portion of the storage system of FIG. 1 in accordance with some embodiments.

FIG. 3 illustrates an exemplary dual-node storage appliance 300 that may comprise at least a portion of the storage system 102 of FIG. 1 in accordance with some embodiments. As shown in FIG. 3, the exemplary dual-node storage appliance 300 comprises a primary node 305-1 and a secondary node 305-2 for redundancy. Each node 305 comprises a corresponding front end 310-1 or 310-2 (sometimes referred to as a front-end entity 310) and a data path 320-1 or 320-2. In one or more embodiments, the controllers 208 of FIG. 2 are part of the front ends 310.

In some embodiments, the primary node 305-1 comprises a system manager 330, sometimes referred to as a "SYM." The system manager 330 adds namespaces 210 and maps the namespaces 210 to a host device 201 for the front ends 310 and processes reservation commands from host device 201 for namespaces 210, as discussed further below in conjunction with FIG. 4.

In addition, the dual-node storage appliance 300 in the example of FIG. 3 comprises one or more SSDs 350-1 through 350-N. In one or more embodiments, one or more of the SSDs 350 store a database of system manager 330 to persistently store reservation data (e.g., intermediate results) while a given reservation command is being processed, to allow a roll-forward recovery in the event of a failure during the processing of the given reservation command, as discussed further below in conjunction with FIGS. 4 and 5. As used herein, an intermediate result of a reservation command is any result of a computation or processing step that occurs during the processing of a given reservation command, before the processing of the given reservation command completes.

In one or more embodiments, the front-end entities 310 perform IO processing by receiving IO operations from a host device 201 and providing a received IO operation to the system manager 330 and/or the data paths 320. In addition, the front-end entities 310 provide responses to the IO operations to the host device 201. The data paths 320-1, 320-2 process IO operations, such as reading data from the SSDs 350 and writing data to the SSDs 350.

If a failure occurs during a processing of a given reservation command using synchronous storage volume reservation techniques, which cause a blocking of the front end 310 until the processing completes, the front end 310 will not get a completion response and will simply re-initiate processing of the reservation command.

One or more aspects of the disclosure recognize that if a failure occurs, for example, by a front end 310 or the system manager 330, during a processing of a given reservation command using the disclosed asynchronous storage volume reservation techniques, where the front end 310 can continue processing other commands until the processing of the reservation command completes, the intermediate results will be lost and the front end 310 (and/or the system manager 330) will not know where to resume the processing of the reservation command. Thus, one or more embodiments of the present disclosure employ persistent storage of reservation data when processing asynchronous reservation commands.

In this manner, in the event of a failure during a processing of a given reservation command, the system manager 330 will be able to recover from the last stage that was executed of the command processing using the persistent stored reservation data.

Figure 4:
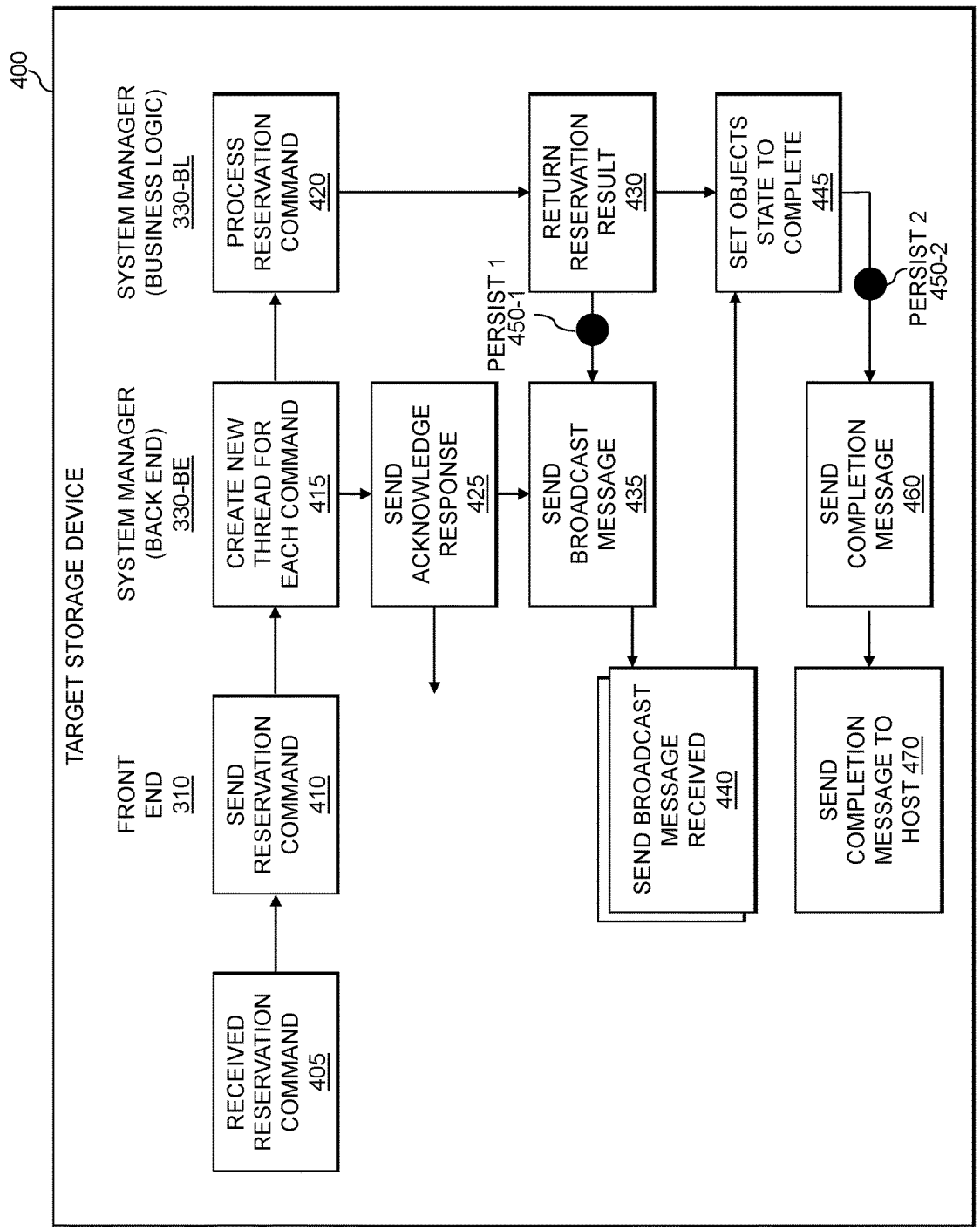
FIG. 4 is a flow chart illustrating an exemplary implementation of an asynchronous process for reserving storage volumes with persistent storage of reservation data, according to an embodiment of the disclosure.

FIG. 4 is a flow chart illustrating an exemplary implementation of an asynchronous process 400, for example, in a target storage device, for reserving storage volumes with persistent storage of reservation data, according to an embodiment of the disclosure.

In the example of FIG. 4, the system manager 330 of FIG. 3 is implemented as a system manager (back end) 330-BE and a system manager (business logic) 330-BL. The front end 310, the system manager back end 330-BE, and the system manager business logic 330-BL each perform portions of the asynchronous process 400 of FIG. 4. As used herein, an asynchronous execution of a reservation command allows the front end 310 to begin executing one or more additional tasks or operations in parallel, without waiting for the processing of the reservation command by the system manager 330 to finish.

As shown in FIG. 4, a reservation command received in step 405 is processed by the front end 310 to send the received reservation command to the system manager back end 330-BE in step 410. The system manager back end 330-BE creates a new thread for each command in step 415 and the front end 310 can continue to process other commands while the system manager 330 processes the current reservation command, using the disclosed asynchronous storage volume reservation techniques.

The system manager back end 330-BE sends an acknowledgement response back to the front end 310 in step 425. The system manager business logic 330-BL processes the current reservation command in step 420 and returns a reservation result to the system manager back end 330-BE in step 430. In addition, the intermediate results (e.g., reservation data) of the reservation command are persisted at a first persistence storage stage 450-1 ("persist 1") using the disclosed techniques for persistent storage of reservation data. As noted above, the persistent stored reservation data may be stored in database maintained in one or more of the SSDs 350.

The system manager back end 330-BE receives the reservation result from the system manager business logic 330-BL and sends a broadcast message to the front end 310 of each storage processor node (e.g., primary node 305-1 and secondary node 305-2) in step 435. Each front end 310 then sends a broadcast message received message to the system manager business logic 330-BL in step 440.

The system manager business logic 330-BL then sets the state of the objects associated with the reservation command to complete in step 445. In addition, the current intermediate results (e.g., reservation data) of the reservation command are persisted at a second persistence storage stage 450-2 ("persist 2") using the disclosed techniques for persistent storage of reservation data.

The system manager back end 330-BE sends a completion message in step 460 to the front end 310, which in turn, sends a completion message in step 470 to the host device 201 (e.g., in at least some embodiments, it is important that the host device 201 knows of the reservation).

In addition, in some implementations, a host device 201 can issue a report command to obtain current reservation information for one or more namespaces 210. The reservation report command may return a reservation status data structure to memory that describes the registration and reservation status of a given namespace 210.

Figure 5:
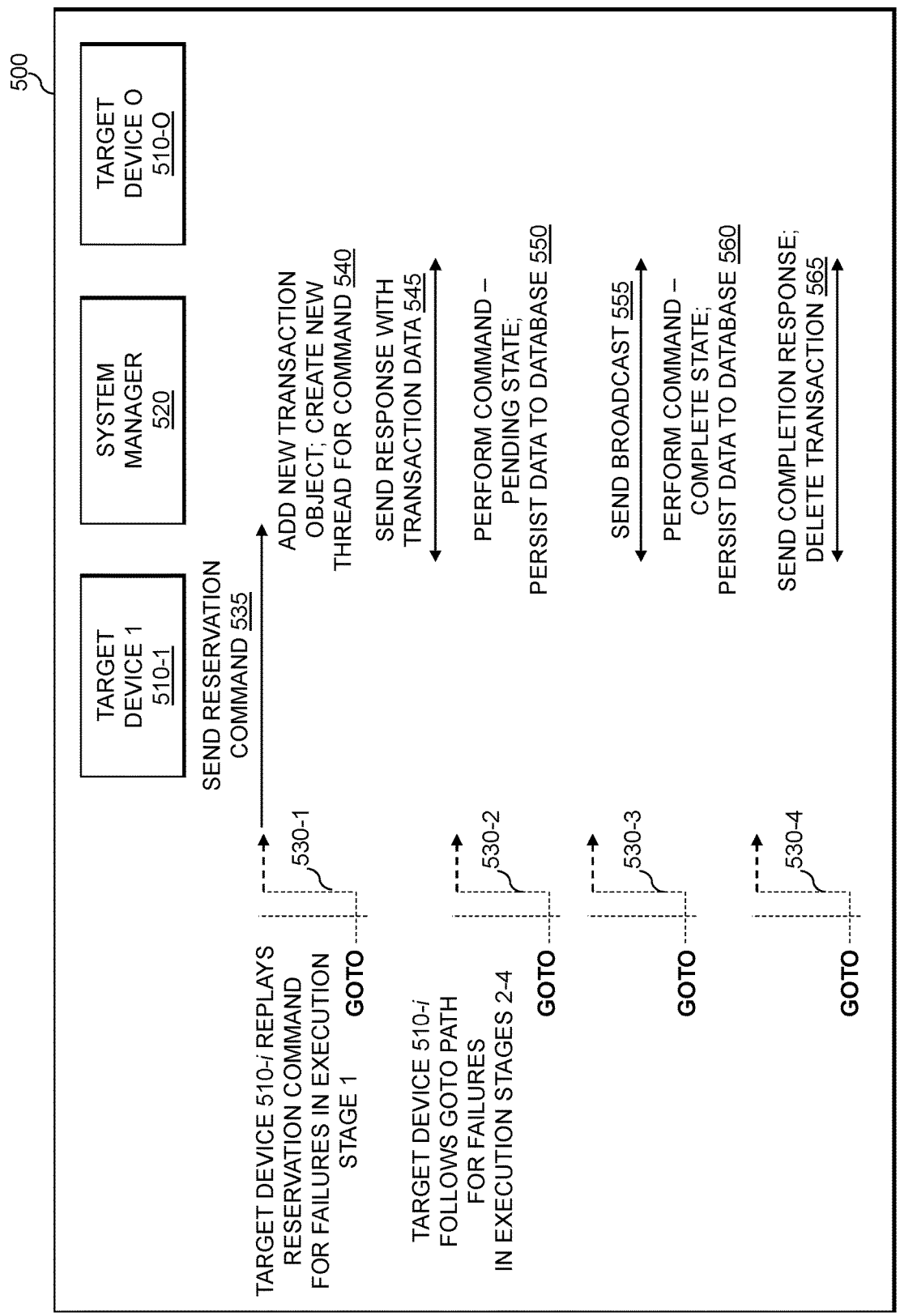
FIG. 5 illustrates an exemplary state diagram for roll-forward recovery in the event of a failure during a processing of a reservation command, in accordance with one or more embodiments.

FIG. 5 illustrates an exemplary state diagram 500 for roll-forward recovery in the event of such a failure during a processing of a reservation command, in accordance with one or more embodiments. As noted above, in some embodiments, reservation data associated with the asynchronous reservation of storage volumes is persistently stored to allow a roll-forward recovery that continues from the last execution stage that was executed and persisted (rather than restarting by processing the command as a new command).

The exemplary state diagram 500 restores the most recent persisted storage (e.g., the first or second persistence storage stage 450-1 or 450-2), and then uses a roll-forward recovery to restore the impacted target device 510-1 through 510-O and/or a system manager 520 to the condition they were in before the failure event; and then continues the reservation command processing using the persisted data.

The exemplary state diagram 500 provides an indication of a recovery mechanism for failures in various execution stages 530-1 through 530-4 of the reservation command. If a failure occurs in a first execution stage 530-1, comprising steps 410, 415, and 425 of the asynchronous process 400, before the front end 310 receives the acknowledgement response with the transaction data sent in step 425, then the target device i (e.g., the front end 310 of the target device that sent the reservation command in step 410 of FIG. 4) restarts by replaying the reservation command in step 535. In addition, the system manager 520 adds a new transaction object and creates a new thread for the reservation command in step 540. The system manager 520 also sends the response with the transaction data in step 545 to the target device i If a failure occurs in a second execution stage 530-2, comprising steps 420 and 430 of the asynchronous process 400, before the initial persistent storage, at the first persistence storage stage 450-1 of intermediate results, then the system manager 520 restarts by following the goto path associated with the second execution stage 530-2 by performing the reservation command with a pending state, in a similar manner as step 420 and persisting the reservation command data (e.g., the intermediate results of the first persistence storage stage 450-1) to a database associated with the system manager 520 in step 550.

If a failure occurs in a third execution stage 530-3, comprising step 435 of the asynchronous process 400, following the initial persistent storage of the first persistence storage stage 450-1 of intermediate results, then the system manager 520 (e.g., system manager back end 330-BE) restarts using the intermediate results of the first persistence storage stage 450-1 by following the goto path associated with the third execution stage 530-3 by the system manager 520 (i) (e.g., system manager back end 330-BE) sending a broadcast message in step 555 to the target devices 510, such as the front end 310 of each storage processor node (e.g., primary node 305-1 and secondary node 305-2), as in step 435, and (ii) (e.g., system manager business logic 330-BL) performing the reservation command with a complete state in step 560, in a similar manner as step 445 and persisting the reservation command data (e.g., the second persistence storage stage 450-2) to a database associated with the system manager 520 in step 560.

If a failure occurs in a fourth execution stage 530-4, comprising step 460 of the asynchronous process 400, following the second persistent storage stage 450-2 of intermediate results, then the system manager 520 (e.g., system manager back end 330-BE) restarts using the intermediate results of the second persistence storage stage 450-2 by following the goto path associated with the fourth execution stage 530-4 to send a completion response and to delete the transaction in step 565.

Figure 6:
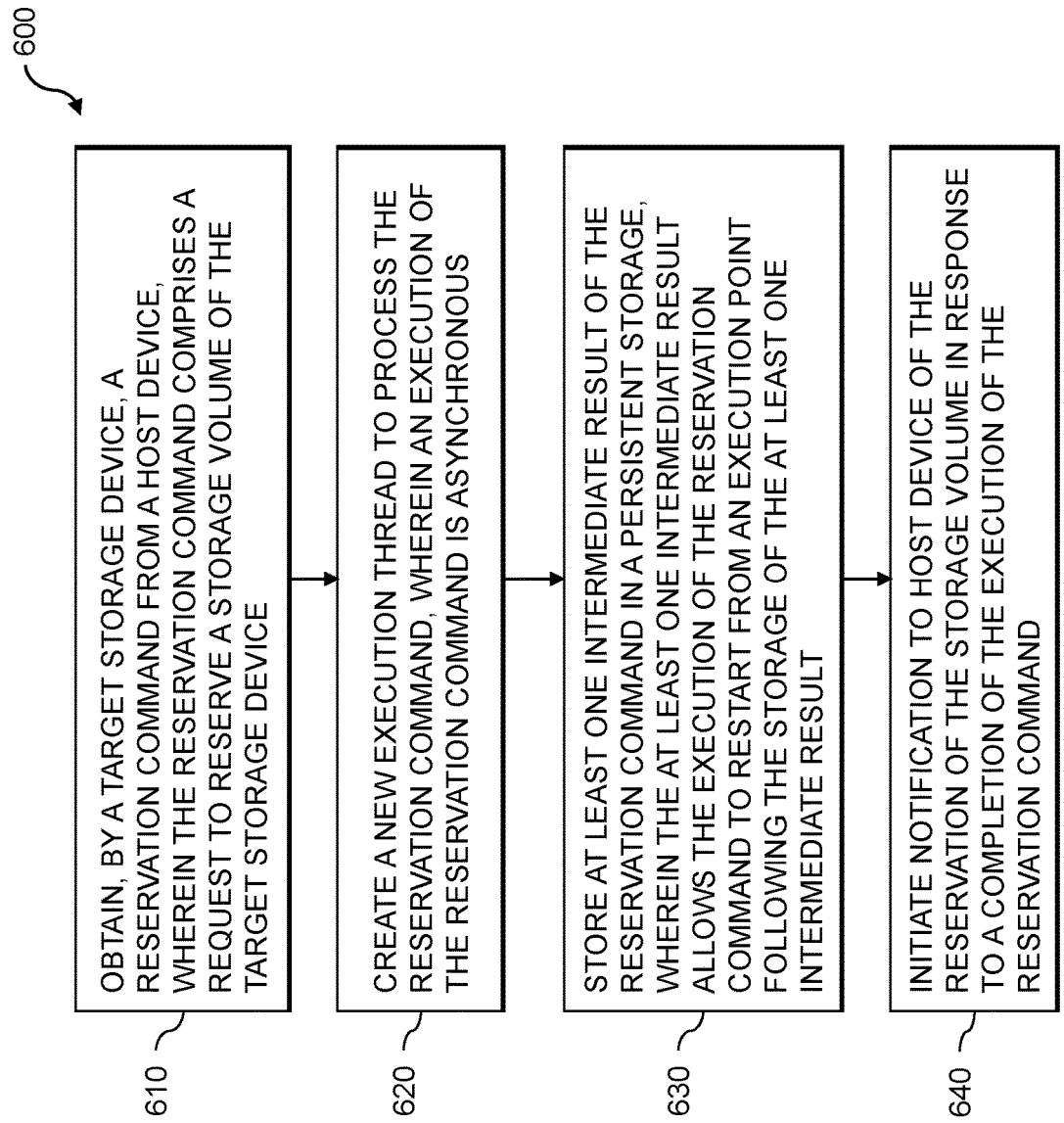
FIG. 6 is a flow diagram illustrating an exemplary implementation of a process for asynchronous reservation of storage volumes with persistent storage of reservation data, according to at least some embodiments.

FIG. 6 is a flow diagram illustrating an exemplary implementation of a process 600 for asynchronous reservation of storage volumes with persistent storage of reservation data, according to at least some embodiments. As shown in FIG. 6, the exemplary process 600 initially obtains, by a target device 510, a reservation command from a host device 201 in step 610. The reservation command comprises a request to reserve a storage volume of the target device 510.

A new execution thread is created in step 620 to process the reservation command. An execution of the reservation command is asynchronous (e.g., the front-end entity 310 of the target device 510 processes one or more additional operations while the reservation command is executed by the system manager 330). At least one intermediate result of the reservation command is stored in step 630 in a persistent storage. The stored at least one intermediate result allows the execution of the reservation command to restart from an execution point following the storage of the at least one intermediate result.

A notification to the host device of the reservation of the storage volume is initiated in step 640 in response to a completion of the execution of the reservation command.

The particular processing operations and other network functionality described in conjunction with the flow diagram of FIG. 6 are presented by way of illustrative example only, and should not be construed as limiting the scope of the disclosure in any way. Alternative embodiments can use other types of processing operations to asynchronously reserve storage volumes using the disclosed techniques with persistent storage of reservation data. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In some embodiments, the disclosed techniques for asynchronous reservation of storage volumes with persistent storage of reservation data improve the scalability of a storage system by allowing a front end 310, for example, to process additional operations while a given reservation command is being processed. Thus, a greater number of reservation commands can be executed in parallel using a similar amount of resources.

In addition, the disclosed persistent storage of reservation data while a given reservation command is being processed provides fault tolerance and allows a roll-forward recovery if a failure occurs during the processing of the given reservation command. In this manner, the availability of the storage system is improved.

One or more embodiments of the disclosure provide improved methods, apparatus and computer program products for asynchronous reservation of storage volumes with persistent storage of reservation data. The foregoing applications and associated embodiments should be considered as illustrative only, and numerous other embodiments can be configured using the techniques disclosed herein, in a wide variety of different applications.

It should also be understood that the disclosed asynchronous storage volume reservation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for asynchronous reservation of storage volumes with persistent storage of reservation data may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based asynchronous storage volume reservation engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based asynchronous storage volume reservation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
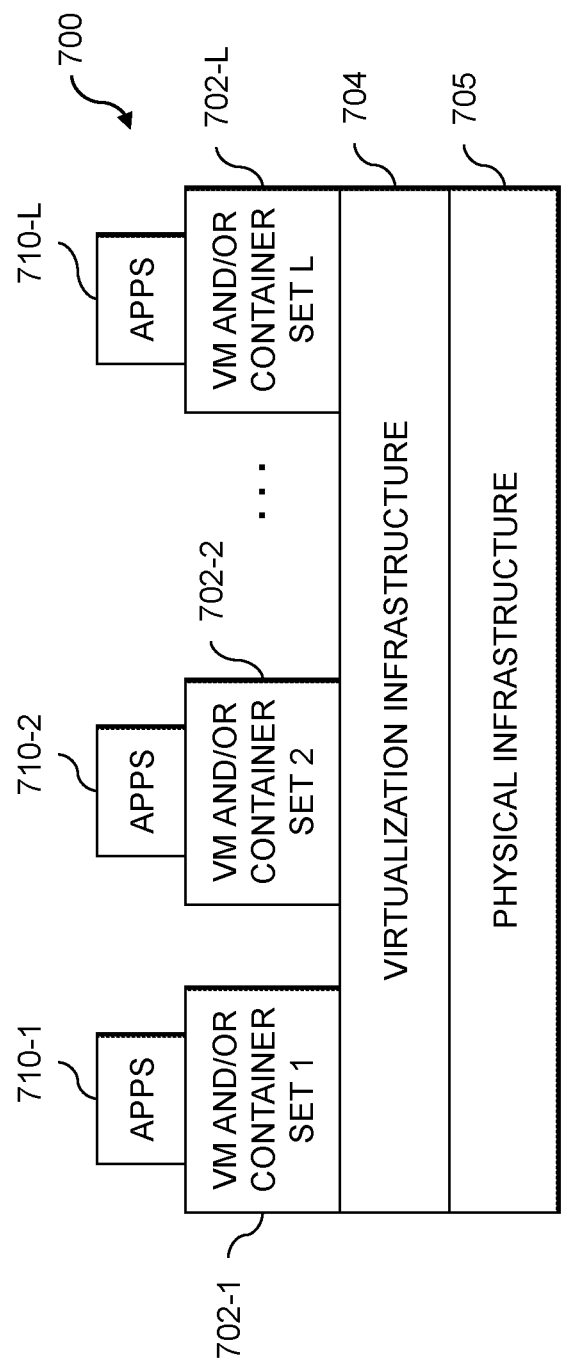
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide asynchronous storage volume reservation functionality of the type described above for one or more processes running on a given one of the VMs. For example, each of the VMs can implement asynchronous storage volume reservation control logic and associated persistent storage of reservation data for providing asynchronous storage volume reservation functionality for one or more processes running on that particular VM.

An example of a hypervisor platform that may be used to implement a hypervisor within the virtualization infrastructure 704 is a compute virtualization platform which may have an associated virtual infrastructure management system such as server management software. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide asynchronous storage volume reservation functionality of the type described above for one or more processes running on different ones of the containers. For example, a container host device supporting multiple containers of one or more container sets can implement one or more instances of asynchronous storage volume reservation control logic and associated persistent storage of reservation data for providing asynchronous storage volume reservation functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
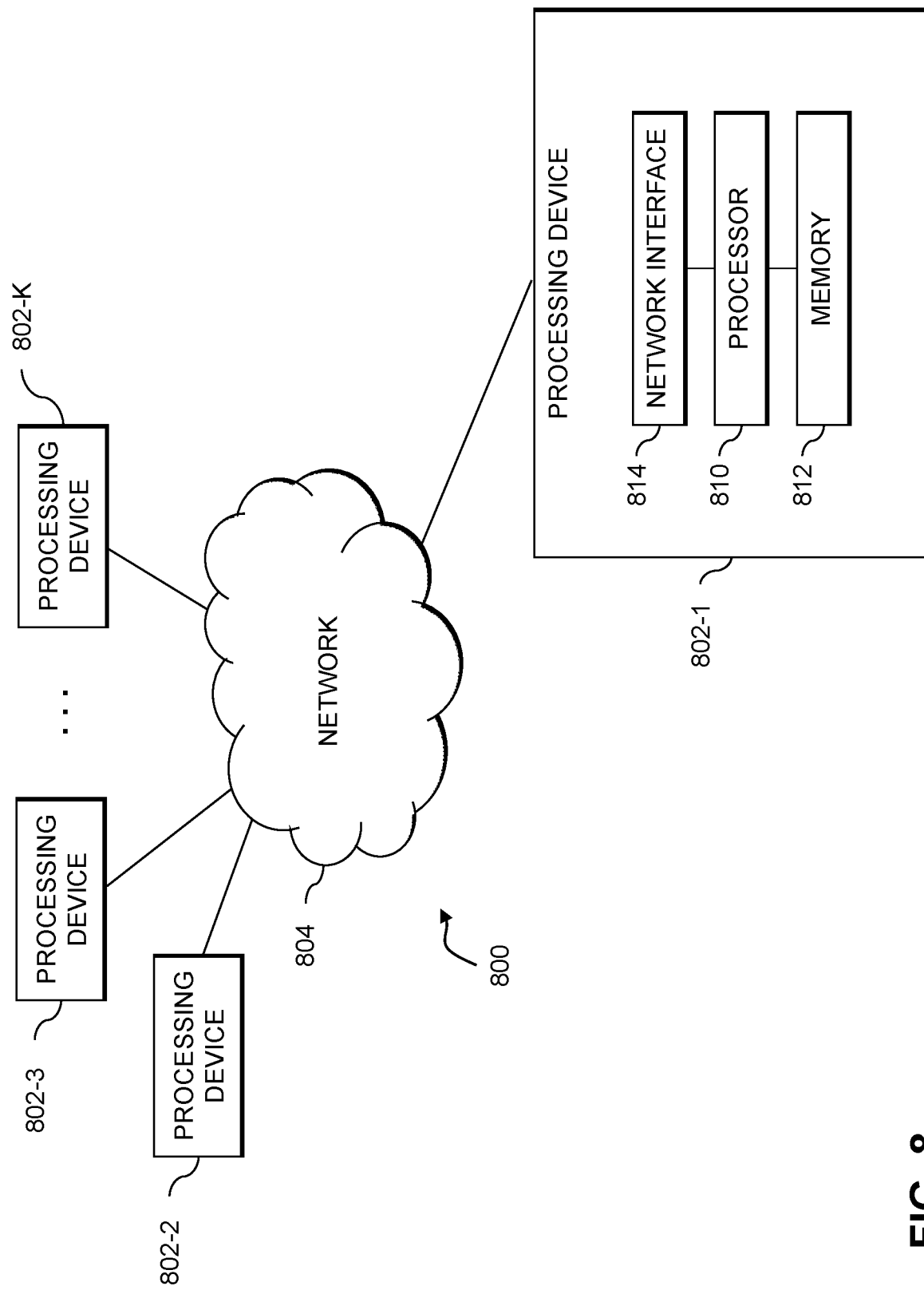
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining, by a target storage device of a storage system, a reservation command from a given host device, wherein the reservation command comprises a plurality of execution stages and wherein the reservation command comprises a request to reserve a storage volume of the target storage device and wherein a reservation of the storage volume restricts access to the storage volume to the given host device;
    creating a new execution thread to process the reservation command, wherein an execution of the reservation command is performed in parallel with one or more additional operations using a plurality of respective processing threads;
    storing at least one intermediate result of the reservation command in a persistent storage, wherein the stored at least one intermediate result comprises reservation data and allows the execution of the reservation command to restart from an execution point following the storage of the at least one intermediate result using the stored reservation data, wherein one or more automated actions are defined to recover from a failure during a processing of respective ones of the plurality of the execution stages of the reservation command, wherein, in response to an occurrence of a failure during a processing of a given one of the plurality of the execution stages of the reservation command, the target storage device performs the corresponding one or more automated actions defined for the given execution stage, and wherein the one or more automated actions defined for at least one of the plurality of the execution stages comprises loading one or more of the stored at least one intermediate result from the persistent storage; and initiating a notification to the given host device of the reservation of the storage volume in response to a completion of the execution of the reservation command;

wherein the method is performed by at least one processing device comprising a processor coupled to a memory.

2. The method of claim 1, wherein the reservation command is provided by a front-end entity of the target storage device to a system manager of the target storage device for execution and wherein an asynchronous execution comprises the front-end entity of the target storage device processing the one or more additional operations in parallel while the reservation command is executed by the system manager.

3. The method of claim 2, wherein the system manager executes a plurality of reservation commands in parallel.

4. The method of claim 2, wherein the notification to the given host device is provided from the system manager to the front-end entity and then to the given host device.

5. The method of claim 1, wherein the reservation command is processed using one or more of an NVM Express protocol and a Small Computer System Interface protocol.

6. The method of claim 1, wherein the reservation of the storage volume comprises reserving a namespace, and further comprising processing a reservation report command from the given host device to provide the given host device with information describing one or more of a registration status and a reservation status of the namespace.

7. The method of claim 1, wherein a roll-forward recovery restarts from a last executed execution stage, of the plurality of execution stages, having a persisted at least one intermediate result.

8. An apparatus comprising:
at least one processing device comprising a processor coupled to a memory;
the at least one processing device being configured to implement the following steps:
obtaining, by a target storage device of a storage system, a reservation command from a given host device, wherein the reservation command comprises a plurality of execution stages and wherein the reservation command comprises a request to reserve a storage volume of the target storage device and wherein a reservation of the storage volume restricts access to the storage volume to the given host device;
creating a new execution thread to process the reservation command, wherein an execution of the reservation command is performed in parallel with one or more additional operations using a plurality of respective processing threads;
storing at least one intermediate result of the reservation command in a persistent storage, wherein the stored at least one intermediate result comprises reservation data and allows the execution of the reservation command to restart from an execution point following the storage of the at least one intermediate result using the stored reservation data, wherein one or more automated actions are defined to recover from a failure during a processing of respective ones of the plurality of the execution stages of the reservation command, wherein, in response to an occurrence of a failure during a processing of a given one of the plurality of the execution stages of the reservation command, the target storage device performs the corresponding one or more automated actions defined for the given execution stage, and wherein the one or more automated actions defined for at least one of the plurality of the execution stages comprises loading one or more of the stored at least one intermediate result from the persistent storage; and initiating a notification to the given host device of the reservation of the storage volume in response to a completion of the execution of the reservation command.

9. The apparatus of claim 8, wherein the reservation command is provided by a front-end entity of the target storage device to a system manager of the target storage device for execution and wherein an asynchronous execution comprises the front-end entity of the target storage device processing the one or more additional operations in parallel while the reservation command is executed by the system manager.

10. The apparatus of claim 9, wherein the system manager executes a plurality of reservation commands in parallel.

11. The apparatus of claim 9, wherein the notification to the given host device is provided from the system manager to the front-end entity and then to the given host device.

12. The apparatus of claim 8, wherein the reservation command is processed using one or more of an NVM Express protocol and a Small Computer System Interface protocol.

13. The apparatus of claim 8, wherein the reservation of the storage volume comprises reserving a namespace, and further comprising processing a reservation report command from the given host device to provide the given host device with information describing one or more of a registration status and a reservation status of the namespace.

14. The apparatus of claim 8, wherein a roll-forward recovery restarts from a last executed execution stage, of the plurality of execution stages, having a persisted at least one intermediate result.

15. A non-transitory processor-readable storage medium having stored therein program code of one or more software programs, wherein the program code when executed by at least one processing device causes the at least one processing device to perform the following steps:
obtaining, by a target storage device of a storage system, a reservation command from a given host device, wherein the reservation command comprises a plurality of execution stages and wherein the reservation command comprises a request to reserve a storage volume of the target storage device and wherein a reservation of the storage volume restricts access to the storage volume to the given host device;
creating a new execution thread to process the reservation command, wherein an execution of the reservation command is performed in parallel with one or more additional operations using a plurality of respective processing threads;
storing at least one intermediate result of the reservation command in a persistent storage, wherein the stored at least one intermediate result comprises reservation data and allows the execution of the reservation command to restart from an execution point following the storage of the at least one intermediate result using the stored reservation data, wherein one or more automated actions are defined to recover from a failure during a processing of respective ones of the plurality of the execution stages of the reservation command, wherein, in response to an occurrence of a failure during a processing of a given one of the plurality of the execution stages of the reservation command, the target storage device performs the corresponding one or more automated actions defined for the given execution stage, and wherein the one or more automated actions defined for at least one of the plurality of the execution stages comprises loading one or more of the stored at least one intermediate result from the persistent storage; and initiating a notification to the given host device of the reservation of the storage volume in response to a completion of the execution of the reservation command.

16. The non-transitory processor-readable storage medium of claim 15, wherein the reservation command is provided by a front-end entity of the target storage device to a system manager of the target storage device for execution and wherein an asynchronous execution comprises the front-end entity of the target storage device processing the one or more additional operations in parallel while the reservation command is executed by the system manager.

17. The non-transitory processor-readable storage medium of claim 16, wherein the system manager executes a plurality of reservation commands in parallel.

18. The non-transitory processor-readable storage medium of claim 16, wherein the notification to the given host device is provided from the system manager to the front-end entity and then to the given host device.

19. The non-transitory processor-readable storage medium of claim 15, wherein the reservation of the storage volume comprises reserving a namespace, and further comprising processing a reservation report command from the given host device to provide the given host device with information describing one or more of a registration status and a reservation status of the namespace.

20. The non-transitory processor-readable storage medium of claim 15, wherein a roll-forward recovery restarts from a last executed execution stage, of the plurality of execution stages, having a persisted at least one intermediate result.

* * * * *